United States Patent

Bickert et al.

[11] Patent Number: 5,907,307
[45] Date of Patent: May 25, 1999

[54] ANTENNA FOR A PORTABLE RADIO COMMUNICATION DEVICE

[76] Inventors: Paul F. Bickert; Daniel B. Murray, both of 1980 Windsor Road, Kelowna, British Columbia, Canada, V1Y 4R5

[21] Appl. No.: 08/875,580

[22] PCT Filed: Jan. 4, 1996

[86] PCT No.: PCT/CA96/00012

§ 371 Date: Jul. 3, 1997

§ 102(e) Date: Jul. 3, 1997

[87] PCT Pub. No.: WO96/21254

PCT Pub. Date: Jul. 11, 1996

[30] Foreign Application Priority Data

Jan. 5, 1995 [CA] Canada .................................. 2139682

[51] Int. Cl.$^6$ .................................................. H01Q 1/24
[52] U.S. Cl. .......................... 343/702; 343/895; 343/841
[58] Field of Search .................................. 343/702, 895, 343/841, 900, 901; H01Q 1/38, 1/24

[56] References Cited

U.S. PATENT DOCUMENTS

| | | | |
|---|---|---|---|
| 4,138,681 | 2/1979 | Davidson et al. | 343/702 |
| 5,030,966 | 7/1991 | Chin et al. | 343/901 |
| 5,159,347 | 10/1992 | Osterwalder | 343/787 |
| 5,335,366 | 8/1994 | Daniels | 455/89 |
| 5,336,896 | 8/1994 | Katz | 250/515.1 |
| 5,504,494 | 4/1996 | Chatzipetros et al. | 343/702 |
| 5,507,012 | 4/1996 | Luxon et al. | 343/702 |
| 5,594,459 | 1/1997 | Hirota | 343/749 |
| 5,650,789 | 7/1997 | Elliott et al. | 343/702 |
| 5,694,137 | 12/1997 | Wood | 343/702 |

FOREIGN PATENT DOCUMENTS

| | | | |
|---|---|---|---|
| 0 511 577 A2 | 4/1992 | European Pat. Off. | H04B 1/38 |
| 0 617 520 A2 | 3/1994 | European Pat. Off. | H04B 1/38 |
| 0 652 645 A1 | 10/1994 | European Pat. Off. | H04B 1/38 |
| WO 93/22804 | 11/1993 | WIPO | H01Q 3/01 |
| WO 94/14208 | 6/1994 | WIPO | H01Q 1/24 |
| WO 94/22233 | 9/1994 | WIPO | H04B 1/38 |
| WO 94/28595 | 12/1994 | WIPO | H01Q 19/09 |

*Primary Examiner*—Hoanganh Le
*Attorney, Agent, or Firm*—Antony C. Edwards

[57] ABSTRACT

An antenna for a portable radio commununication device including a first elongate electrically conductive member (10) having opposed first and second ends, the first end adapted to be mounted in electrical communication to a radio communication device (18). A radiation field pattern is generated by radiation emitted by the first elongate electrically conductive member (10) and the radio communication device (18) during radio transmission, the radiation field pattern having maximum intensity at a first location. Means (24) for increasing radiation resistance is mounted to the first electrically conductive member at an opposition at generally the second end of the first member, whereby the radiation field pattern maximum intensity is shifted from the first location to a second location closer to the second end of the elongate member (10), and near field intensity of the radiation field pattern at the first location is reduced over an operational bandwidth of the radio communication device (18).

16 Claims, 12 Drawing Sheets

(a)

(b)

(c)

(d)

(e)

(f)

(g)

(h)

(i)

(a)

(b)

(c)

(d)

(e)

(f)

(g)

ANTENNA FOR A PORTABLE RADIO COMMUNICATION DEVICE

FIELD OF THE INVENTION

The present invention concerns radiation reduction apparatus of a type intended to be used in conjunction with hand-held or otherwise portable radio phones and the like to reduce, re-direct, or redistribute away from a user or other radiation dissipative medium radiation emitted from the radiation emitting structure of the phone, such as the antenna.

BACKGROUND OF THE INVENTION

Cellular and other portable radio telephones typically have antennas which extend from the housing of the phone. While the phone is in use the antenna emits radiation which has caused concern among the medical community as to the radiation's effects on the user of the phone.

The use of flexible protective shields to protect personnel against X-ray frequency and Gamma frequency radiation such as may be emitted by X-ray machines or by nuclear reactors, respectively, is known in the art as illustrated by U.S. Pat. No. 3,039,001 entitled "Flexible Protective Plastic Shield" and by U.S. Pat. No. 5,012,114 entitled "Radiation Shield".

U.S. Pat. No. 3,039,001 discloses that a sheet of vinyl or other plastic material containing resin, plasticizer and stabilizer may have a protective material such as pulverized lead uniformly distributed therethrough in order to provide a flexible sheet of material which protects the wearer against X-rays, Gamma rays, Neutron rays, secondary cosmic rays and the like.

U.S. Pat. No. 5,012,114 discloses a gamma radiation shield which comprises a wrappable sheet of gamma radiation shielding material to which is affixed releasable contact-fasteners, which are so dimensioned and configured that when a shield member is wrapped around a gamma radiation emitting structure, complimentary locking portions of the releasable fasteners engage each other to securely hold the shield member in shielding position wrapped around the structure. The gamma radiation shielding material may be comprised of the known construction of fine lead powder being uniformly dispersed in a matrix of thermo-plastic material which serves as a binder for the lead powder so as to form a flexible sheet. The releasable contact-fasteners may be of a type sold under the trade-mark Velcro. The patent is directed to protecting personnel in nuclear reactors and the like by shielding conduits such as pipes, most clearly seen in FIG. 6 of the patent, through which radioactive material flows.

The use of electromagnetic shielding to minimize interference between electromagnetic signals radiated by cellular phones and like electronic equipment with another portion of that equipment and the minimization of such interference by interposing electrically conducting material in the form of a shield between the source of the electromagnetic signals and the circuitry subject to interference is taught by U.S. Pat. No. 5,124,889 entitled "Electromagnetic Shielding Apparatus for Cellular Phones". The reference to electromagnetic shielding does not appear to be concerned with protecting the user of the electronic device from radiation from the antenna or the like.

With portable radio telephones such as hand-held cellular phones, radio waves that carry the call emanate directly from the telephone, specifically the length of the telephone and antenna, most intensely at a midpoint there along, while the telephone is held to the ear of the user. There is concern that the radio frequency waves entering the dissipative medium of the user's head may cause heating, cancer or DNA fragmentation.

There is currently being marketed a cellular phone radiation shield being sold under the trade-mark "Cellguard", manufactured by Quantum Laboratories of Renton, Wash., U.S.A. As discussed in more detail below, the "Cellguard" device consists of two sections of molded plastic, each with metal inside, that serves to block or deflect the radio frequency signal. One part of the device covers the phone's antenna and the other part fits over the earpiece of the phone. The metal of the Cellguard device is placed between the antenna and the user and between the earpiece and the user. A similar device, that is, an arrangement in which a radiation shielding device is placed between the antenna and the user is taught in U.S. Pat. No. 5,335,366 which issued to Daniels on Aug. 2, 1994. In particular, Daniels discloses a radiation shielding apparatus for a radio transmitting device having a radiation shield disposed between the antenna and a user, the radiation shield for absorbing, blocking and/or reflecting electromagnetic wave radiation.

U.S. Pat. No. 5,336,896 which issued to Katz on Aug. 9, 1994 for a cellular telephone users protective device teaches a cellular telephone accessory both for protecting a user from electromagnetic radiation and for providing a handle for the cellular phone. In particular, a tilt and swivel base is taught to permit moving the cellular phone antenna away from close contact with the user's head and to also supply a carrying handle. What is further taught is providing a protective magnetic radiation shielded jacket to contain the cellular phone within the jacket, the antenna tilt and swivel base attached to the outside of the jacket.

The present invention has at least five objects. The first object, in one embodiment, is to reduce the overall amount of electromagnetic radiation emitted by reducing the emitted power of the antenna. The second object, in a further embodiment, is to redistribute the radiation in the vicinity of the phone and in particular the antenna, ie. in the near field, away from an associated dissipative medium such as the head of a user. Consistent with this object, the present invention changes the near field radiation pattern surrounding a radio communication device such as a radio phone, and in particular surrounding the device's antenna so that: (a) a reduction is attained in radiation field strength during transmission thereby reducing "hot spots" at the associated dissipative medium such as the user's head; (b) a reduction is attained in the amount of radiated energy during transmission which is absorbed by the associated dissipative medium, to thereby increase the effective power of the radio transmission; and, (c) an increase is attained in the effectiveness of the antenna during reception of radio transmissions by an increase in the effective exposure of the antenna.

The third object is to accomplish the above objects without significantly adversely affecting the operation of a radio communication device such as a cellular telephone within a cellular telephone communication system, which adverse operation may result if the antenna excessively loses radiating power or becomes excessively directional. In the case of cellular telephones it is desirable that the far field radiation pattern does not have large signal strength variations with the direction in which the signal is sent. It is desired that the user can hold the cellular telephone in a random orientation without concern about the direction in which the signal must travel in order to reach the center of the cell. Modification of an antenna can result in large changes to the far field radiation pattern. Since this is undesirable, it is an object of the present invention to not cause large changes to the far field radiation pattern while at the same time, over the entire desired operational bandwidth, minimizing the near field "hot spots" on an associated dissipative medium where radiation strength is excessive, minimizing the amount of radiation absorbed by the dissipative medium, and maximizing the effective exposure of the antenna to reception of radio transmissions.

The fourth object is to avoid damage or undue strain on the internal electrical circuitry of the cellular phone. Such damage is conceivable in a situation where a modification to the antenna results in a greater electrical load being placed on the electrical circuitry so that a greater current flows through parts of the cellular phone. If this increased current exceeds the limits contemplated by the designers of the cellular phone, some internal parts of the cellular phone could have their operation impaired or could malfunction.

The fifth object is to maintain operation of the receiving function of the cellular telephone to an acceptable degree. The antenna of the cellular telephone simultaneously operates with two functions. One is to transmit signals, and it is this function that results in high intensity radiation being present in the vicinity of the cellular telephone. The second function of the antenna is to receive signals from a distant source, convert these signals into oscillating electrical currents which are converted by the circuitry of the cellular telephone into a voice message heard by the user. It is conceivable that modifications to the antenna could decrease the ability of the cellular phone to clearly receive these incoming signals. It is an object of the present invention to not cause unacceptable reduction in the quality of these incoming signals, but in fact to increase the reception quality by increasing the effective exposure of the antenna.

SUMMARY OF THE INVENTION

The present invention is, in a first embodiment, a radiation reducing or re-directing device suitable for use on or in conjunction with cellular phone antenna, or radiation emitting structures of portable radio communication devices. The device has antenna near field radiation pattern redistribution means for redistributing near field radiation away from a user of the radio communication device, the antenna near field radiation pattern redistribution means mountable in proximity to a radio communication device and in particular the antenna, and in a further embodiment, on an opposed side of the antenna or of the radio communication device (for example, where the device does not have an antenna) to the user. The device may also include an antenna power reduction means for reducing the antenna power. The materials out of which the device is made may include dielectric materials, magnetically permeable materials, conductive materials, insulating materials, semiconducting materials, superconducting materials, or any combination of these materials. Dielectric materials are understood to include materials whose permittivity exceeds the permittivity of free space, or which act to diffract electromagnetic waves of a wavelength relevant to the operation of a radio communication device, or which slow down the propagation of electromagnetic waves of a wavelength relevant to the operation of a radio communication device. In particular, the dielectric material may have, in order of preference, a dielectric constant of at least 3, of at least 6, of at least 9, of at least 12 and of at least 15.

The structure of the device may be of an arbitrary shape of a material, in any number of pieces. The structure may be layered, or mixed in any manner, including the application of thin layers in the interior or on the surface. The structure can include electronic components which have the effect of decreasing the electrical current in the antenna or otherwise reducing the power of the radiation emitted by the antenna. That is, the present invention may consist of any electrical device which is placed between the cellular phone antenna connection point and the antenna whose effect is to provide an electrical impedance to the antenna current. This includes, but is not limited to, devices having resistance, capacitance, or inductance, or a combination of these properties. The device may also attach to the free end of the antenna.

The structure of the device may be placed in the proximity of an antenna, or in contact with the antenna, or may form an extension of the antenna, or may form a component of the antenna or may replace the existing antenna of a radio communication device. The device does not, however, act as a shield so as to come between an existing radiation emitting structure such as an antenna and parts of the user's body which are closest to the radiation emitting structure.

The present invention may also consist of a device between the cellular phone and the antenna, built in to the cellular phone, which provides the user with the ability to adjust the effect of the device so that the intensity of the radio waves may be adjustably made greater or smaller. This could be a variable capacitor, variable resistor or variable inductor, but it is not restricted to these.

The present invention could take any of the forms mentioned above and also have provision for adjustment by the user to attain greater or lesser intensity of radio waves.

The present invention could take any of the forms mentioned above and also have automatic provision for adjustment, ie. reduction, of the intensity of emitted radio waves. This automatic adjustment could be triggered by sound level and accomplished by built-in circuitry, or a device could be electrically attached to the cellular phone to accomplish the automatic adjustment.

In a further embodiment, the present invention may take the form of an improved antenna for a portable radio communication device which includes, a first elongate electrically conductive member having opposed first and second ends, where the first end is adapted to be mounted in electrical communication to a radio communication device, whereby when the first elongate electrically conductive member is mounted in electrical communication to a radio communication device, a radiation field pattern is generated by radiation emitted by the first elongate electrically conductive member and the radio communication device during radio transmission, the radiation field pattern having maximum intensity at a first location, the device also including means for increasing radiation resistance of the first elongate electrically conductive member mountable at an optimized position at generally the second end, whereby, when the means for increasing radiation resistance is mounted to the first elongate electrically conductive member at the optimized position at generally the second end and the first elongate electrically conductive member is mounted in electrical communication to a radio communication device, during radio transmission the radiation field pattern maximum intensity is shifted from the first location to a second location closer to the second end, and near field intensity of the radiation field pattern at the first location, i.e. by the users head for example, is reduced over an operational bandwidth of the radio communication device.

In an alternative further embodiment, the present invention may take the form of an antenna improvement device for a portable radio communication device antenna, wherein the antenna is a first elongate electrically conductive member having opposed first and second ends and the first end is adapted to be mounted in electrical communication to a radio communication device, and wherein when the first elongate electrically conductive member is mounted in electrical communication to a radio communication device a radiation field pattern is generated by radiation emitted by the first elongate electrically conductive member and the radio communication device during radio transmission, the radiation field pattern having maximum intensity at a first location, for example, by the users head or other undesirable dissipative medium. The antenna improvement device including: means for increasing radiation resistance of the first elongate electrically conductive member mountable at an optimized position at generally the second end, whereby, when the means for increasing radiation resistance is mounted to the first elongate electrically conductive member at the optimized position at generally the second end and the first elongate electrically conductive member is mounted in electrical communication to a radio communication device, during radio transmission the radiation field pattern maximum intensity is shifted from the first location to a second location closer to the second end, and near field intensity of the radiation field pattern at the first location is reduced over an operational bandwidth of the radio communication device.

Advantageously, in both the further embodiment and the alternative embodiment, the means for increasing radiation resistance of the first elongate electrically conductive member is a short parasitic element, which may be a helical electrically conductive coil, wherein the helical electrically conductive coil may be mountable over the second end to thereby journal the second end within a cavity within the helical electrically conductive coil at least partially along the cavity so as to optimize antenna performance by reducing near field radiation intensity at the first location without substantially adversely affecting far field performance.

Alternatively, the short parasitic element may be a short second elongate electrically conductive member mountable generally adjacent and parallel to the first elongate electrically conductive member.

In the present invention, the antenna may be a monopole antenna.

In the further embodiment and alternative further embodiment of the present invention, the radio communication device radiation has a range of operational wavelengths corresponding to the operational bandwidth and the short parasitic element may have a length of less than approximately three-quarters of one-half of a wavelength within the range of operational wavelengths. The short parasitic element may advantageously have a length of approximately 1/20th of a wavelength within the range of operational wavelengths.

In the present invention, the short parasitic element may be a short length of dielectric material mountable generally adjacent and parallel to the first electrically conductive member.

The dielectric material is an inert matrix impregnated with heavy metal, where the heavy metal may be heavy metal powder, and where the inert matrix may be flexible. The inert matrix impregnated with heavy metal may be lead vinyl. In the further embodiment and the alternative further embodiment of the present invention, the means for increasing radiation resistance may include means for increasing capacitance of the first elongate electrically conductive member. The means for increasing capacitance of the first elongate electrically conductive member may be conductive material, where the conductive material may be mountable into the second end.

The means for increasing radiation resistance may include means for decreasing current in the first elongate electrically conductive member, where the means for decreasing current is an inductor, resistor or capacitor. The means for decreasing current may be mountable between the first elongate electrically conductive member and the radio communication device at the first end.

The means for increasing capacitance of the first elongate electrically conductive member may alternatively be a length extension of the first elongate electrically conductive member mountable onto the first elongate electrically conductive member whereby the first elongate electrically conductive member may be mismatched to circuitry within the radio communication device. The length extension may be mountable onto the second end. Further, alternatively, the means for increasing capacitance of the first elongate electrically conductive member may be a replacement first elongate electrically conductive member, where the replacement first elongate electrically conductive member is longer than the first elongate electrically conductive member and the replacement first elongate electrically conductive member may be substituted for the first elongate electrically conductive member.

The present invention, may further include means for adjusting the capacitance of the means for increasing capacitance.

In the alternative embodiment and further alternative embodiment, the short parasitic element may be tilted so that its longitudinal axis of the antenna, whereby, because of the directional characteristics of the short parasitic element, tilting the longitudinal axis of the short parasitic element towards the dissipative medium at the first location may accomplish a further reduction in near field radiation intensity at the first location.

BRIEF DESCRIPTION OF THE DRAWINGS

In the drawings, which represent specific embodiments of the present invention, but which should not be construed as limiting the scope of the invention in any way.

DETAILED DESCRIPTION OF PREFERRED EMBODIMENTS

The Cellguard Device

Figure 1A:
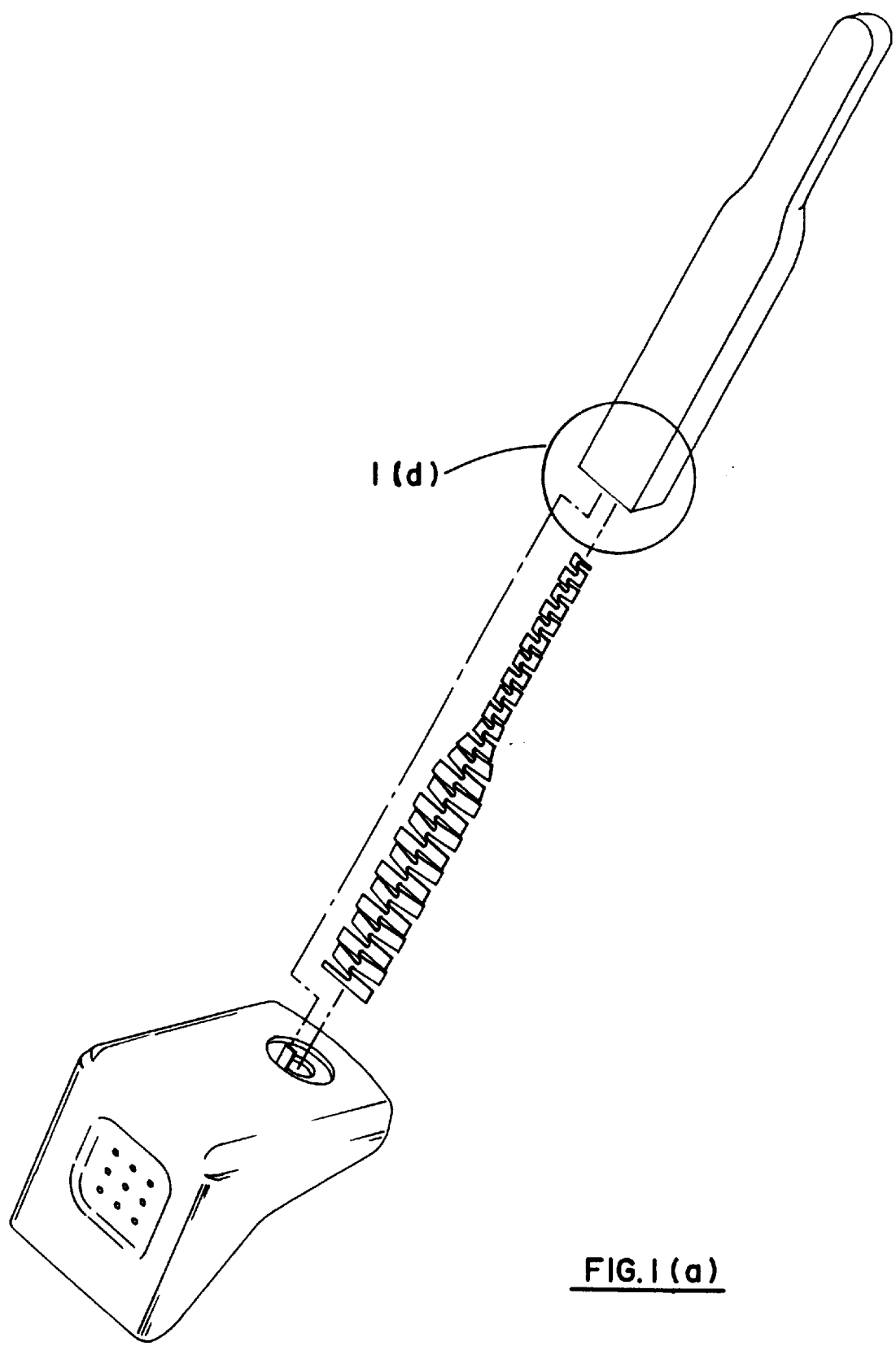
FIGS. 1(a), 1(b) and 1(c) are, respectively, an exploded perspective view of the Cellguard device, a fragmentary partially cut away view of the base of the Cellguard antenna cover, and a reverse perspective view of the Cellguard earpiece cover.
Figure 1C:
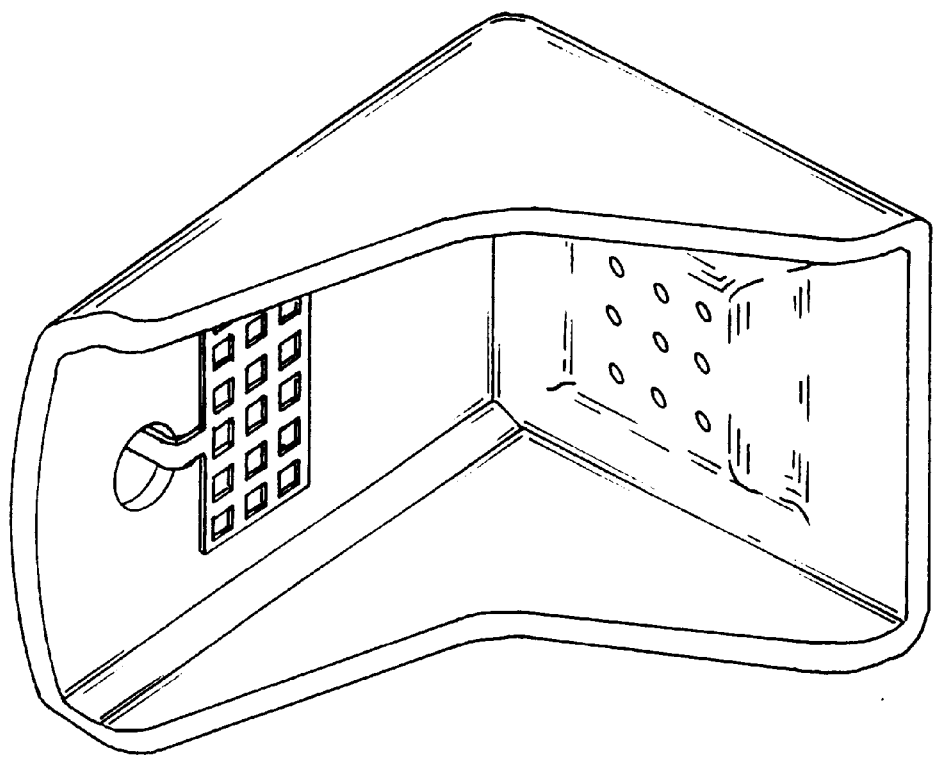
Figure 1B:
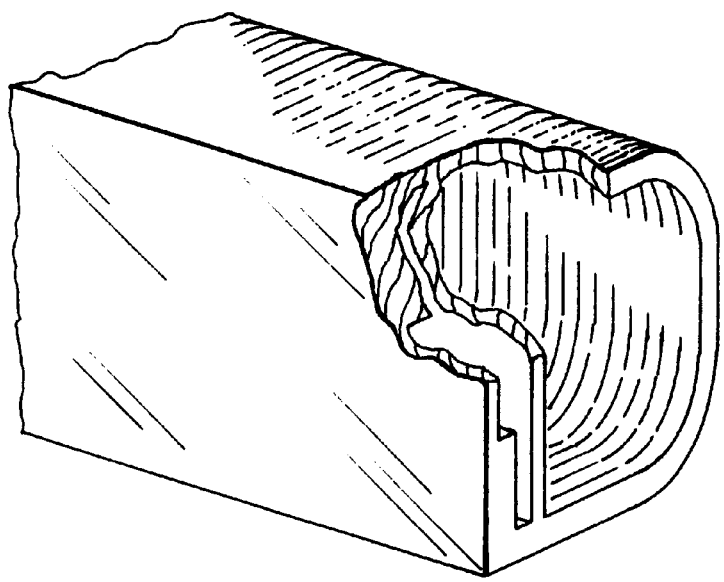

As mentioned above, the Cellguard device exists in the prior art. It is depicted in FIGS. 1(a)–1(c). Testing of the flexible metal alloy strip of the Cellguard device indicates that it is likely a carbon steel alloy mostly comprised of chromium and iron. As may be seen, the geometric shape of the metal alloy strip combined with the flexible properties of the alloy, allow the alloy strip to be flexed, although repeated flexing, it has been found, results in fatigue and eventual failure of the alloy along the centre line of the alloy strip where the alloy is narrowest by design to accommodate the flexing of the alloy strip. The base of the alloy strip electrically connects to a metal tab extending substantially vertically from the earpiece covering portion of the Cellguard device. The base of the alloy strip and the metal tab are electrically connected, once installed on a cellular phone, to the casing of the cellular phone by metal-to-metal contact with the metal base of the antenna (not shown). The metal tab may be seen protruding vertically from the earpiece cover in FIG. 1(a) and may also be seen protruding vertically upwards through the antenna receiving hole in the earpiece cover as depicted in FIG. 1(c). The metal alloy strip depicted in FIG. 1(a) is encased in a urethane plastic moulding along the flat side of the moulding shown in FIG. 1(a) and better seen in perspective partial cut-away view of FIG. 1(b).

The Cellguard device relies on a conventional method of shielding, namely, the electrical grounding of conductive shielding material placed alongside a radiation source between the radiation source and the object to be shielded.

Principles of Radio Transmission

Figure 1D:
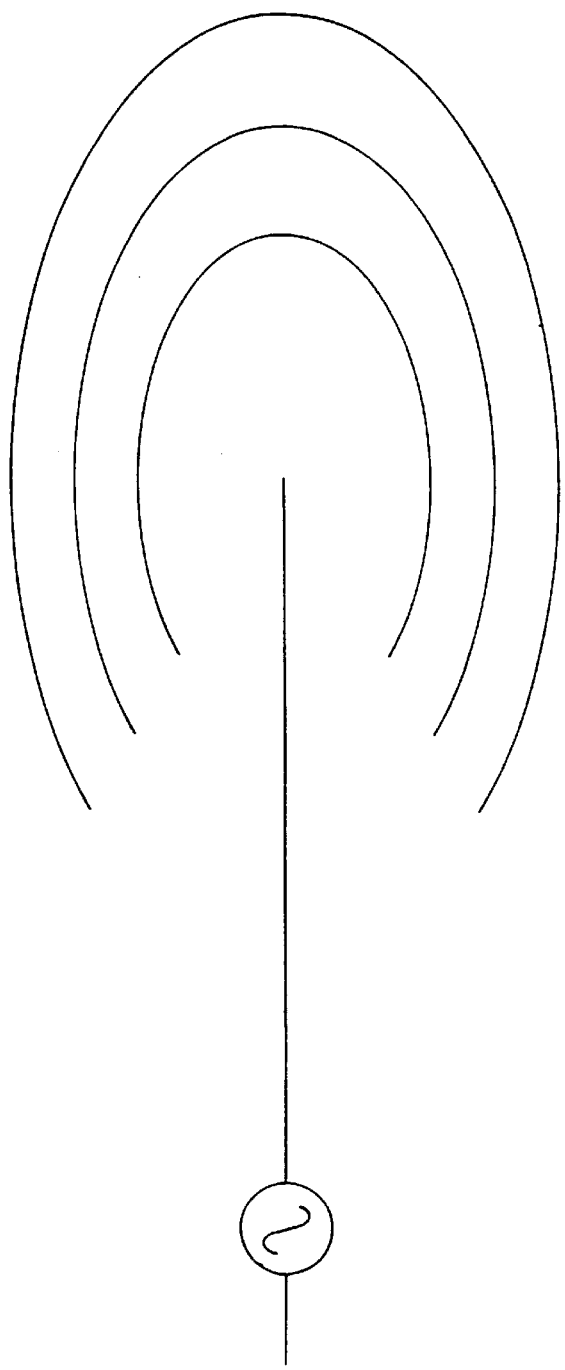
FIGS. 1(d) and 1(e) are schematic views of the operation of a prior art radio communication device antenna.

In this section, the means by which the objects of the present invention are accomplished will be explained with reference to an extremely simplified version of the operation of a cellular phone, which is illustrated schematically in FIG. 1(d) and 1(e). FIG. 1(d) illustrates the physical arrangement of the cellular telephone. Note that only the circuitry that transmits the signal from the portable cellular telephone to the cell centre is shown. The entire circuitry of the cellular telephone is represented by a single device conventionally called a radio frequency (RF) oscillator. This RF oscillator generates an alternating voltage at a frequency between 800 and 900 megahertz. One terminal of the RF oscillator is electrically connected to the chassis of the cellular telephone. The other terminal of the RF oscillator is attached to a length of wire which forms the antenna. In fact, during transmission not only the antenna per se, but the antenna and the conductive elements electrically connected to the RF oscillator act as an "antenna" so that the entire telephone, in this case the antenna and the chassis, radiate radiation. Because the radiation field is strongest at approximately the mid-point of the overall radiating body, the maximum radiation intensity will be at approximately where the cellular phone is held closest to the head of the user. The alternating voltage from the RF oscillator forces alternating current to flow in the antenna. This current creates electric and magnetic fields in the air surrounding the antenna. These electric and magnetic fields oscillate at the same frequency between 800 and 900 megahertz. These oscillations ripple outwards like waves on a pond surface, and carry the signal to the distant antenna at the centre of the cell, except where they are absorbed by the dissipative medium associated with the operation of a cellular phone, namely, the ear, skull, brain etc. of the user.

The type of dissipative medium associated with a radio communication device will depend on the particular application of the device. One example is the cellular telephone where health hazards have been identified with the intense near field radiation strongest near the base of the antenna, which is emitted by the cellular phone and which causes hot spots in the user's head (where a "hot spot" is a reference to the heating of the dissipative medium where the radiation from the antenna is being absorbed). Another example of a dissipative medium associated with a radio communication device may be that of an antenna mounted in proximity to a dissipative medium such as radiation absorbing material used for current radar defeating technology. In such an application, much of the effective radiating power of the antenna may be lost due to absorption of the radiation by the dissipative medium unless the radiation field can, by the present invention, be redistributed away from the dissipative medium without substantially adversely affecting the far field performance of the antenna.

Figure 1E:
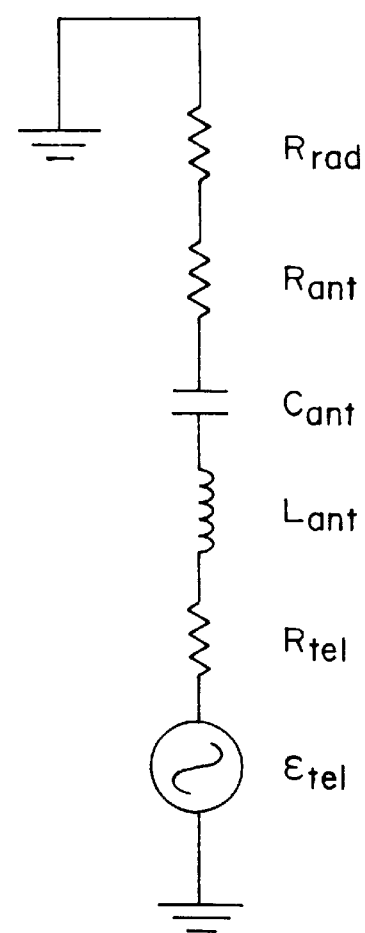

FIG. 1(e) schematically depicts the cellular telephone of FIG. 1(d), modified to schematically illustrate the electrical properties of the circuit. The antenna has three kinds of electrical properties. The first is inductance, which is the characteristic of maintaining a current in a wire once the current is flowing. The second is capacitance, which is the characteristic of building up a stored charge in an electrical component when voltage is applied. The third is resistance, which is the ratio of the voltage applied across a conducting material to the current flowing through the conducting material.

The antenna, together with the circuitry inside the cellular telephone, has inductance, and the value of this inductance is represented by the symbol $L_{ant}$, and is understood to be expressed as a number of Henries. The antenna, together with circuitry inside the cellular telephone, has capacitance, and the value of this capacitance is represented by the symbol $C_{ant}$, and is understood to be expressed as a number of Farads. The antenna, considered as a piece of wire, has an electrical resistance, expressed by the symbol $R_{ant}$, and is understood to be expressed as a number of Ohms. In addition to this, the internal circuitry of the cellular telephone has some resistance, which is expressed by the symbol $R_{tel}$. Furthermore, the antenna has an extra resistance due to the creation of radio waves by the motion of currents in the antenna, and this is expressed by the symbol $R_{rad}$. This last resistance is conventionally called radiation resistance.

The RF oscillator inside the cellular telephone generates a voltage that oscillates with time. The symbol $\epsilon_{tel}$ represents this voltage, and is measured in volts. The actual voltage varies with time.

The maximum is $\epsilon_{tel}$ and the minimum is $-\epsilon_{tel}$. The root mean squared (rms) voltage supplied is therefore 0.70711 $\epsilon_{tel}$. The frequency of the oscillation is represented by the symbol $f$, and is understood to be measured in Hertz. The value of $f$ varies, depending on the cellular phone channel being used, but is in the range from 800,000,000 Hertz to 900,000,000 Hertz, that is, from 800 MHz to 900 MHz.

Mathematically, the voltage from the RF oscillator is a function of time, where t stands for time in seconds. The voltage applied at a given instant of time, t, is represented by the notation $\epsilon(t)$. The mathematical equation for $\epsilon(t)$ is $$\epsilon(t)=\epsilon_{tel} \cos (2 \pi f t) \qquad [2.1]$$

where "cos" represents the cosine function and "$\pi$" (pi) has the value of 3,1416, approximately.

Current is the motion of electricity. Current is measured in terms of a rate of flow of electricity, and is specified in Amps. The current in the simplified model of the cellular telephone depicted in FIG. 1(b) oscillates with time. The current in the antenna as a function of time is represented by the function $I(t)$. The maximum value of $I(t)$ is $I_{ant}$ and the minimum value of $I(t)$ is $-I_{ant}$. The root mean squared (rms) current in the antenna is 0,70711 $I_{ant}$. Mathematically, $I(t)$ can be expressed as $$I(t)=I_{ant} \cos ((2 \pi f t)-\phi) \qquad [2.2]$$

where the symbol $\phi$ (phi) is called the phase angle of the current, and is measured in radians. It is a well known result of electric circuit theory that $$I_{ant}=\epsilon_{tel}/\sqrt{[(R_{ant}+R_{rad}+R_{tel})^2+(2 \pi f L_{ant}-1/(2 \pi f C_{ant}))^2]} \qquad [2.3]$$

See for example P. Tipler Physics for Scientists and Engineers, 3rd edition, Worth, 1991 at page 913. D. Halliday, R. Resnick and J. Walker Fundamentals of Physics, 4th edition, Wiley, 1993, at page 962. R. Boylestad Introductory Circuit Analysis, 6th edition, Merrill, 1990, at page 793.

At this point an additional assumption is made, which is that the antenna is being driven at or near resonance. The term resonance in this case means that $$(2 \pi f L)=1/(2 \pi f C) \qquad [2.4]$$

It is often, but not always, the case in electrical engineering practice that an antenna is designed so that it is at resonance at the frequency at which it is used. If the antenna is indeed at resonance, then the current and voltage are related by $$I_{ant}=\epsilon_{tel}/(R_{ant}+R_{rad}+R_{tel}). \qquad [2.5]$$

This equation only holds true in that special circumstance.

The next quantity to consider is the power being radiated by the antenna. Power is energy per unit time, and is measured in Watts. The power emitted by a handheld cellular telephone can vary, but is generally less than 0.6 Watts. The total power leaving the antenna in the form of radio waves is denoted by P, and is related to the current in the antenna. The relation is as follows:

$$P=I^2_{ant}/(2 R_{rad}) \qquad [2.6]$$

Means for Reduction of Emitted Power

One of the objects of the present invention is to reduce the output or emitted power. P. The above equation shows that this can be accomplished either by decreasing the antenna current, $I_{ant}$, or by increasing the radiation resistance, $R_{rad}$, or both, or by some combined variation of $I_{ant}$ and $R_{rad}$ where either $I_{ant}$ increases or $R_{rad}$ decreases so long as the overall effect on P is a decrease.

Returning to equation [2.3], it can now be seen that it is possible to decrease the emitted power of a cellular telephone with a resonant or near-resonant antenna by doing any of the following:

(a) Increasing $R_{ant}$;
(b) Increasing $C_{ant}$;
(c) Increasing $L_{ant}$; or,
(d) Increasing $R_{rad}$ Any means taken that reduce the antenna current, $I_{ant}$, has the potential to reduce undesired strain on internal components of the circuitry of the cellular phone.

Near Field Radiation Pattern

According to electromagnetic theory, currents, charges, electric fields and magnetic fields are related by fundamental physical laws which are called Maxwell's equations.

Charge is a property of matter associated with the creation of electric and magnetic fields around matter and forces upon material objects in the presence of electric and magnetic fields. The distribution of charge as a function of position and time is mathematically represented by the charge density function, which is denoted by the symbol $\rho$ (rho). Since charge density takes different values at different places and times, this dependency is incorporated in the symbol $\rho$ (x,y,z,t), where x, y and z are the three Cartesian components of position in space, in meters, and t is the time in seconds.

Knowledge of charge density alone is insufficient to determine the electric and magnetic fields. The additional necessary information is of the distribution of electrical currents. This is mathematically expressed in the three quantities called the components of current density, denoted by the symbols $j_x$, $j_y$ and $j_z$. Current density is measured in Amps per square meter. Each of these functions depends on position and time. For example, the dependence of $j_x$ on position and time is expressed in the symbol $j_x(x,y,z,t)$.

If current density and charge density due to an antenna are known, and if radio waves from all other sources are ignored, then the pattern of radio waves around the antenna can be determined. However, some information is needed about the materials in the space surrounding the antenna, if this space is not empty. The information that is needed is typically the electric permittivity, magnetic permeability and electrical conductivity of the material. The symbol for electric permittivity is $\epsilon$. The symbol for magnetic permeability is $\mu$. The symbol for electric conductivity is $\sigma$. All of these will be functions of position.

Radio waves in space are mathematically represented in terms of electric and magnetic fields. The electric field has three components, denoted by $E_x$, $E_y$ and $E_z$. Each field is a function of position and time. Thus, for example, one writes $E_x(x,y,z,t)$ to denote the x-component of electric field at position x, y and z at time t. Each of these quantities is measured in volts per meter.

The magnetic field also has three components, denoted by the symbols $B_x$, $B_y$ and $B_z$ which depend on position and time so that one would write, for example, $B_x$ (x,y,z,t). Each of these quantities is measured in Teslas.

Once all information about charge density, current density, permittivity, permeability and conductivity is available, the quantities $E_x$, $E_y$, $E_z$, $B_x$, $B_y$, and $B_z$ can be calculated at each point in space for any time. See for example Jackson Classical Electrodynamics, 2nd edition, Wiley 1975.

For descriptive purposes, the terms "near field" and "far field" are useful. A point in space much farther from the antenna than many wavelengths of the radio waves is considered to lie in the far field. One wavelength of the radio waves of a cellular phone is a distance of approximately 0.4 meters. The cell centre with which the cellular telephone is in contact is always in the far field. The near field refers to locations that are less than a wavelength away from the antenna. Points in space that satisfy neither criterion are said to be in the "intermediate region".

If the situation is changed by altering any of the relevant variables, including charge density, current density, permittivity, permeability or conductivity, the electric and magnetic fields can be expected to change. In the present invention, arrangements are made to change the relevant variables of the space surrounding the antenna in such a way as to attain desirable changes in the electric and magnetic fields, that is, reductions in the electric and magnetic fields in those regions where the associated dissipative medium, which in the case of a cellular phone is the user's head, is irradiated by the greatest amplitude of electric and magnetic fields emitted by the antenna.

Alteration of Near Field Radiation Pattern

In keeping with the second object of the present invention, radiation exposure of a user of a portable radio communication device such as a cellular phone may be reduced by redistributing the near field radiation pattern. This object may be accomplished either independently, or simultaneously with the accomplishment of the first object, namely, the reduction of the emitted power of the antenna.

Figure 2:
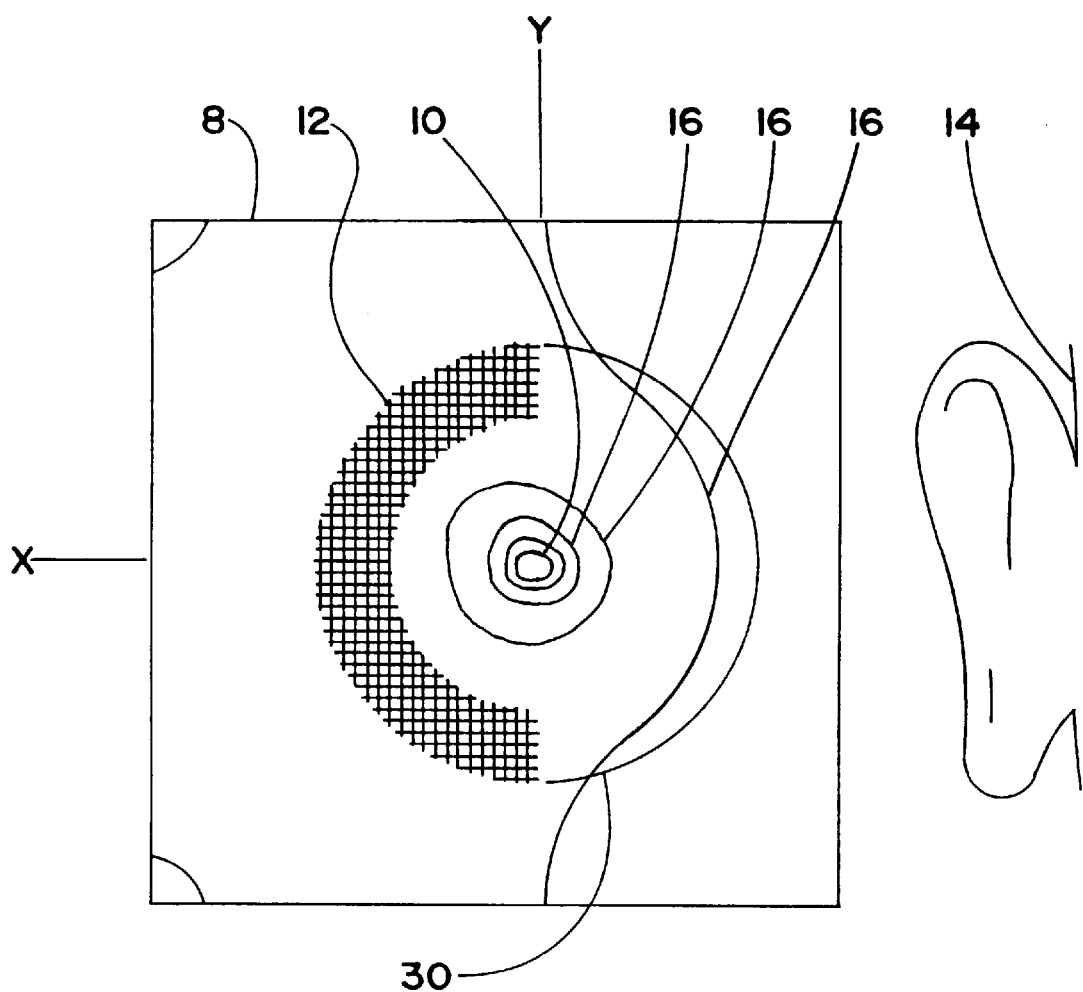
FIG. 2 is a cross-sectional view along lines 2—2 in FIG. 3 illustrating a time averaged near field radiation pattern.

In order to determine physical device configurations to accomplish these objects in a compatible manner, computer techniques involving space-discretized versions of Maxwell's equations were used to approximately determine the electric and magnetic fields around an emitting antenna when the permittivity, permeability and conductivity were changed. These techniques permitted the creation of an animated picture of the behaviour of the electric and magnetic fields around the antenna. FIG. 2 is a time averaged depiction of one such animation illustrating the re-distribution of the near field radiation pattern, in a horizontal plane, according to the second object of the present invention.

Figure 3:
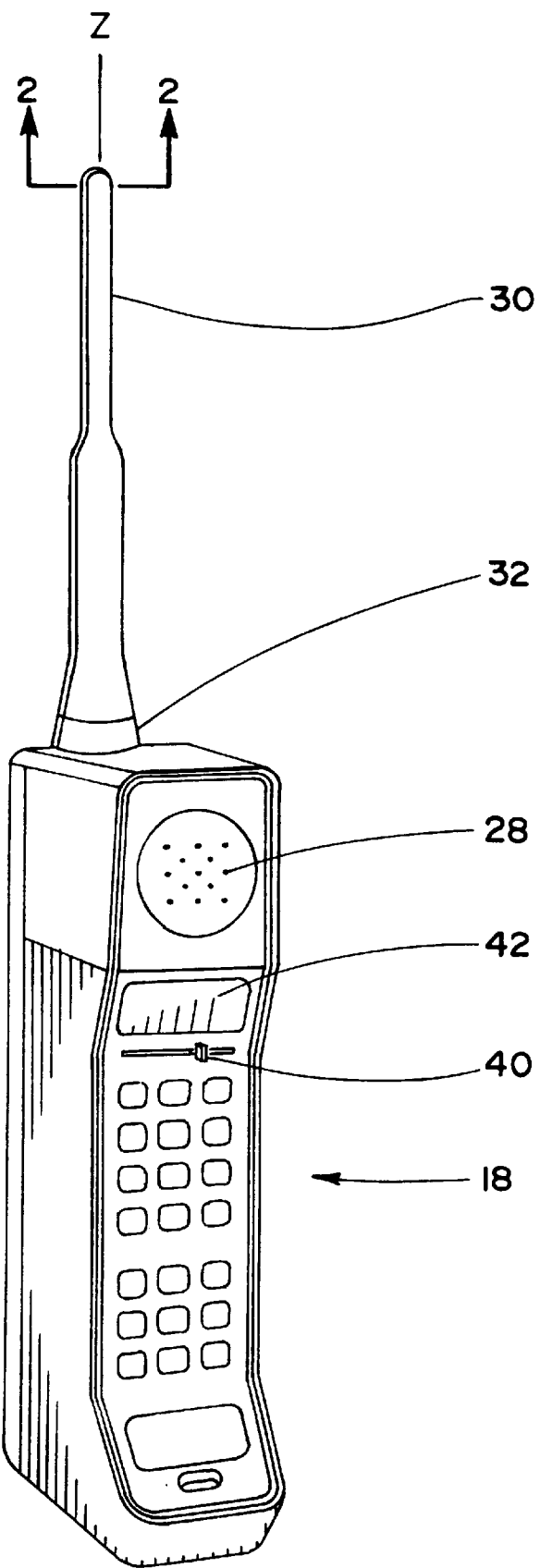
FIG. 3 is, in perspective view, a radio communication device incorporating one embodiment of the radiation reduction apparatus of the present invention.

The square border 8 in FIG. 2 represents an outline of a square region of the two-dimensional x-y plane in the representative section 2—2 in FIG. 3. The dot 10 in the centre of square 8 represents the antenna 10, which extends parallel to the z-axis (see FIG. 3). For the approximation represented by FIG. 2, the antenna 10 was mathematically represented as being infinitely long. The C-shaped region represents a radiation redistributing object 12 with a dielectric constant of 12 which extends along the z-axis with the same cross section at all points along the z-axis. Object 12 redistributes the pattern of near field radiation about antenna 10 so that one side of the antenna 10, namely, the side closest the user and opposite object 12, has a lower intensity of radiation. The head of user 14 is approximately located in the position illustrated in FIG. 2 since the radiation intensity is lower there as indicated by the contour lines 16 of constant radiation intensity. The shape of object 12 is merely representative.

An alternating current flows in the antenna 10 with a frequency of 800 Megahertz. The direction of current flow is along the z-axis. In cellular telephone 18 circuitry inside the telephone would apply a voltage to the base of antenna 10 which would cause these currents to flow. According to the laws of electromagnetic theory, known as Maxwell's equations, flowing currents are associated with electric and magnetic fields in and around the antenna, which carry energy away from the antenna.

In FIG. 2, only the z-component of the electric field is illustrated, although all electric and magnetic field components must be considered and were considered in the simulation. The time averaged square of the electric field is shown by the contour lines 16 which are in equal increments. The contour lines 16 show that the electric field is smaller in the position between antenna 10 and the user 14.

The boundary conditions applied at the square border 8 (which correspond to spatial dimensions of approximately 8 cm×8 cm in the x-y plane) are that electromagnetic radiation propagates through the boundaries with nearly no back reflection. This is intended to approximate a transmitting antenna operating in an open region of space, or inside a room in which the user is talking on the telephone.

The method by which the fields represented by contour lines 16 were calculated was to use arrays of numbers to represent the electric and magnetic fields at each point on a square grid. The Maxwell equations were integrated in time numerically using standard numerical methods. Repetitions of these calculations with different time step intervals and other variations of parameters in the calculation reproduce similar results, indicating that these results are not obviously numerically unstable.

The operation and usefulness of the device of the present invention for reducing and redistributing radiation depends on the parameters chosen. In particular, the dielectric constant must be sufficiently large (FIG. 2 is based on a dielectric constant of 12) to produce a significant decrease in radiation in the region between antenna 10 and user 14. Similarly, the dimensions of the device in the x-y plane must be sufficiently large to produce a significant decrease in radiation. The present invention includes all shapes thicknesses, orientations and compositions of possible devices that can be placed in the proximity of or in contact with the antenna so long as the body of the device has a sufficient dielectric constant and does not function as a shield. That is, the body of the device such as illustrated representatively by object 12 does not come in-between the antenna and the user. The result in the embodiment of FIG. 2 is a directional redistribution of the intensity of the radiation field away from the user 14.

Figure 4B:
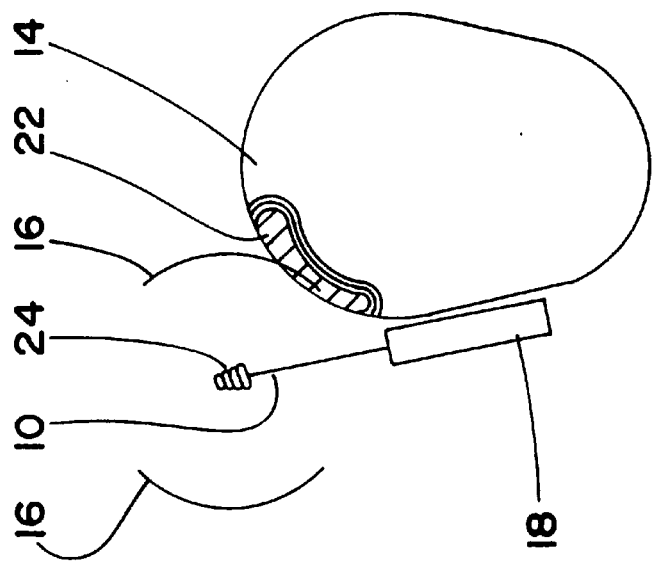
FIG. 4b is the diagram of FIG. 4a illustrating a redistributed radiation field associated with the improved antenna of the present invention.
Figure 4A:
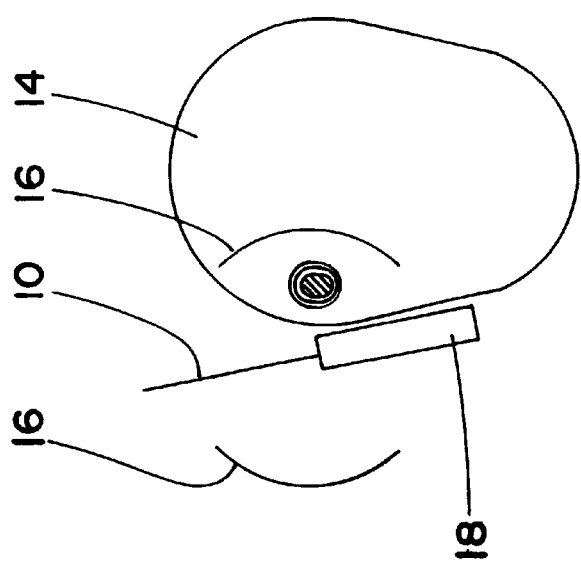
FIG. 4a is a diagram illustrating the radiation pattern associated with prior art hand held portable communication devices.

The second object may also be accomplished independently of a reduction in power of the antenna by redistributing the electric field 16, as depicted in FIG. 4, longitudinally along antenna 10 away from user 14. A conventional radiation field is depicted in FIG. 4(a). The redistributed radiation field as a result of the improved antenna of the present invention is depicted in FIG. 4(b). The representative illustration of hot spot 22 in FIG. 4(a) is meant to illustrate an area of localized absorption of radiation from antenna 10 by user 14. Hot spot 22 in FIG. 4(b) is meant to illustrate a reduced localized radiation intensity or a reduced amount of localized radiation absorbed by user 14 as a result of the redistribution of the radiation field 16 along antenna 10.

Far Field Radiation Pattern

The far field radiation pattern is irrelevant to the degree of exposure experienced by the user 14 of the cellular telephone, since those parts of the body which receive the greatest exposure such as the hand, car, skull and brain lie within the near field region of the antenna when the phone is in use. However, the far field radiation pattern affects the functioning of the cellular telephone as a communication system and must be considered in order to design a workable device.

Computer techniques based on space-discretized Maxwell's equations can also be applied to calculate the far-field pattern. Alternatively, experiments can be done in test ranges. One such experiment is described below. Some extent of variation in the far field radiation pattern is acceptable. Too much variation will make the signal too weak if the cellular phone is held in certain orientations or if the effective antenna power is too low due to excessive absorption of the radiated energy by the dissipative medium.

Preferred Embodiments

The embodiments of the present invention accomplish a reduction in radiation nearest an associated dissipative medium as for example, a reduction in the radiation field nearest a user of a portable radio communication device. This reduction is accomplished by methods consistent with obtaining objects one and two as set out above, namely, a power reduction method of radiation reduction and a redistribution method of radiation reduction.

The power reduction method of radiation reduction may be accomplished by increasing the capacitance of the antenna 10. However, a radiation reduction apparatus may comprise merely any means to decrease the amount of current flowing in antenna 10. This may be accomplished by, for example, mounting either an inductor, a capacitor, or a resistor in electrical connection between antenna 10 and the phone antenna circuit applying a voltage to the base of antenna 10. For screw-on type antennas, a screw-in type insert 32 is illustrated in FIG. 3 installed between antenna casing 30 and phone 18. Decreasing the current in the antenna in this embodiment has the effect of decreasing the power of the antenna thereby reducing the level of radiation irradiating user 14.

In a further embodiment, the antenna power may be reduced by increasing the capacitance of the antenna, thereby deliberately creating a mismatch between the antenna and the radio circuitry, either by placing an antenna extension onto antenna 10 to thereby increase the length of antenna 10 or, alternatively, merely replacing antenna 10 with a longer antenna. In a further alternative embodiment, increasing the capacitance of antenna 10 may be accomplished by mounting a conductive material onto the free end of antenna 10.

It is envisaged that the various means described above for decreasing the power of the antenna to thereby reduce the emitted radiation may be adjustable, either automatically or manually. The power of the radiation emitted by antenna 10 would in this embodiment only be increased when conditions (either, atmospheric or environmental, such as by use of phone 18 within a shielding enclosure) make transmission from phone 18 to the receiver at the centre of the cell more difficult. In the more usual situation where transmission is relatively unimpeded and lower power levels will suffice, the antenna power may be reduced either automatically by the circuitry within phone 18 or manually by a user adjusting a power level knob or the like either on phone 18 or, for example, on insert 32.

Similarly, the power in antenna 10 may be automatically adjusted by the circuitry within phone 18 to lower levels when user 14 is merely listening and not transmitting during a conversation. The power would be increased automatically once user 14 began speaking, the power level adjusted to attain an acceptable signal to noise ratio.

Illustrated in FIG. 6 are the above-described embodiments of the present invention in which antenna 10 is depowered by means of insert 32. Insert 32 may have, respectively, an inductor, a capacitor, or a resistor connected between antenna 10 and the antenna circuitry of phone 18 (see FIGS. 6(*a*)–6(*c*) respectively). Alternatively, antenna 10 may be extended by antenna extension 33 to increase antenna capacitance as depicted in FIG. 6(*d*). Further alternatively, as shown in FIG. 6(*e*) end material 35 mounted therein, may be provided for releasable mounting on the free end of antenna 10, the capacitance of antenna 10 thereby increased to decrease the radio power emitted by the antenna, Capacitance increasing material 35 may be any material which increases the capacitance of antenna 10, including a dielectric material such as lead vinyl or a conducting material such as aluminum or steel. It is understood that capacitance increasing material 35 is not limited to end-cap applications such as depicted in FIG. 6(*e*), nor is it restricted to longitudinal applications extending the length of antenna 10. As merely a further example, capacitance increasing material may be a block centrally mounted along antenna 12 such as depicted in FIG. 6(*i*).

Figure 7:
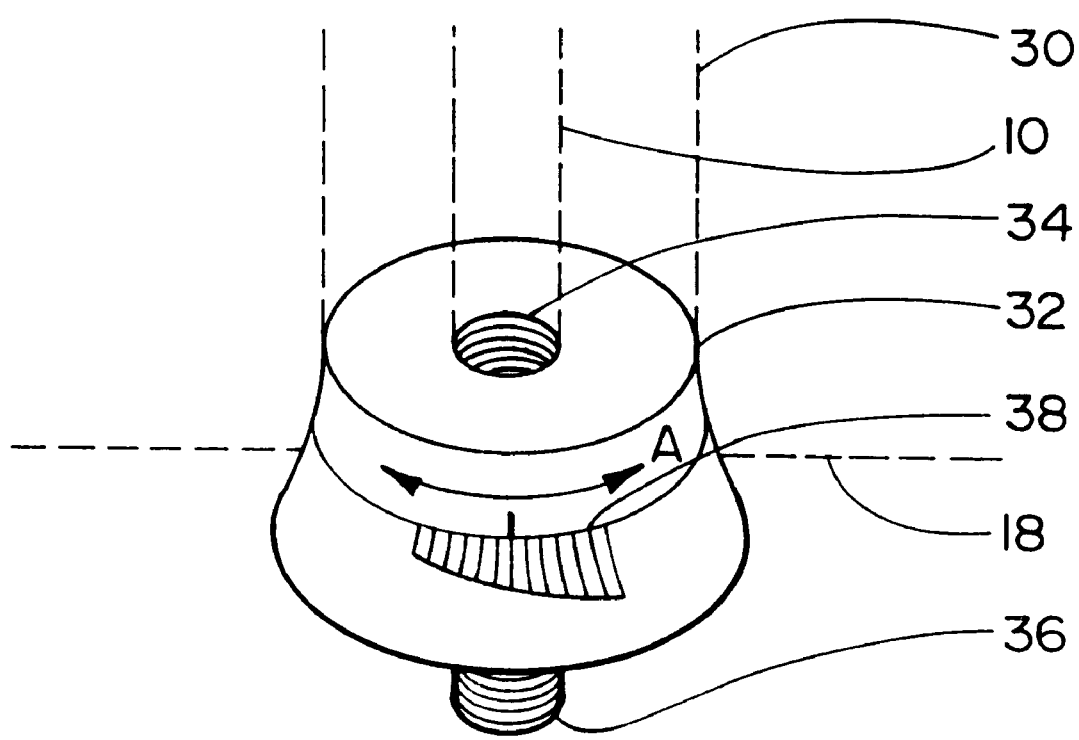
FIG. 7 is an enlarged perspective view of an antenna insert embodiment incorporating one aspect of the present invention.

FIGS. 6(*f*)–(*h*) illustrate the above described embodiments in which the antenna power may be automatically or manually adjusted. Specifically, FIG. 6(*f*) schematically illustrates insert 32 having an adjustable inductor. FIG. 6(*g*) schematically illustrates insert 32 having an adjustable capacitor. FIG. 6(*h*) schematically illustrates insert 32 having an adjustable resistor. FIG. 7 illustrates one embodiment of insert 32 having a variable means for adjusting the antenna power. Antenna 10 is threadably mountable in receiving a threaded socket 34. Socket 34 electrically connects to one side of an adjustable inductor, adjustable capacitor, adjustable resistor or the like, the other side electrically connected to the antenna circuitry in phone 18 by a threaded male end 36. An adjustable dial 38 is provided whereby an upper part of insert 32 may be rotated in direction A so as to either increase or decrease the antenna power, the relative power level indicated on a lower part of insert 32 which remains stationary as the upper part of insert 32 is rotated to adjust the antenna power.

Alternatively, as illustrated in FIG. 3, a slider knob 40 or digital adjustment means (not shown) such as by a button on the phone may be provided on phone 18 for adjusting the antenna power, the relative antenna power levels indicated via display 42 or (although not shown) by a series of light emitting diodes or the like. Slider knob 40 may be slid to vary the antenna power by adjustably varying for example, an inductor, a capacitor, or a resistor electrically connected between antenna and the antenna circuitry of phone 18.

The redistribution method of redistributing the near field radiation pattern is accomplished by either of two ways, both of which may also increase the radiation resistance of the antenna 10 to decrease resultant radiated power, namely: (a) dielectric material (radiation redistributing object 12 in FIG. 2, for example a dielectric strip such s lead vinyl or other flexible medium providing a matrix for holding a heavy metal powder) positioned on the one side of antenna 10 in opposed relation to user 14, or (b) a short parasitic element (hereinafter an "SPE") positioned towards or at the free end of antenna 10.

Figure 5D:
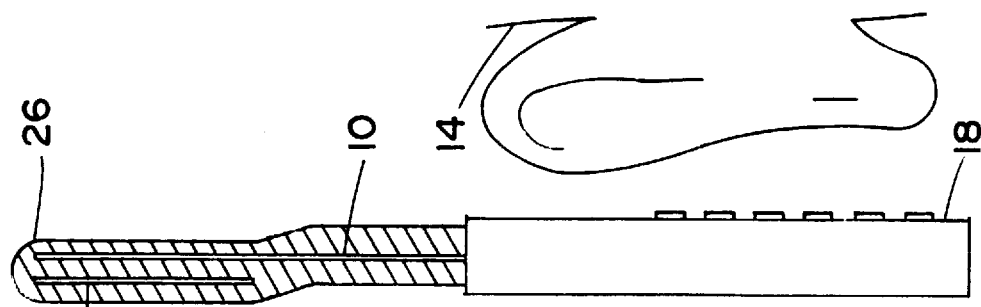
FIGS. 5c and 5d are a side elevation view of a further embodiment of a cellular telephone having a retractable improved antenna according to the internal construction of FIG. 5b.
Figure 5C:
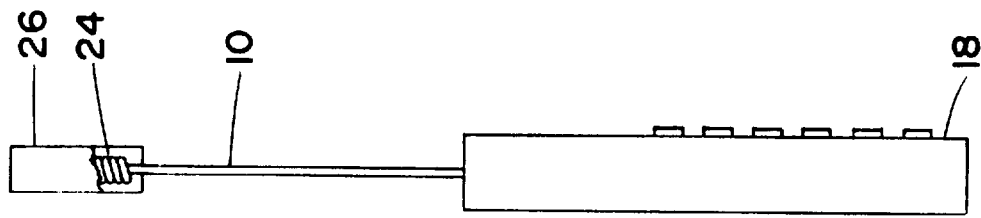
Figure 5B:
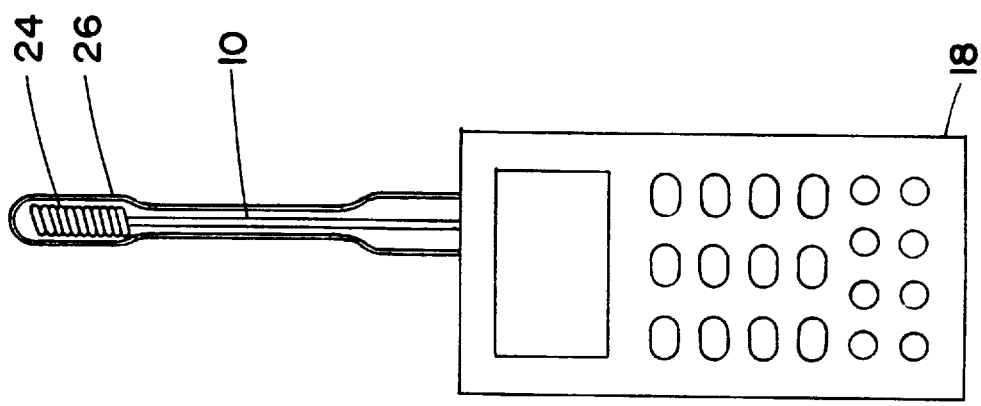
FIG. 5b is the cellular telephone of FIG. 5a with the antenna casing partially cut away.
Figure 5A:
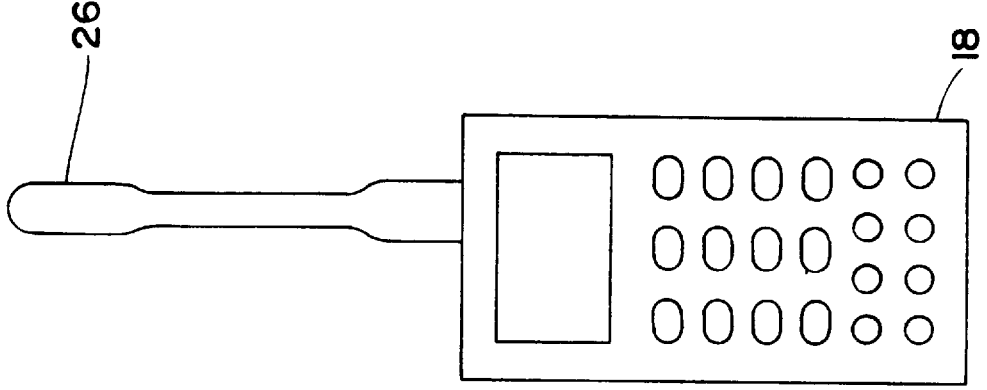
FIG. 5a is a front elevation view of a cellular telephone having an improved antenna of the present invention.
Figure 6A:
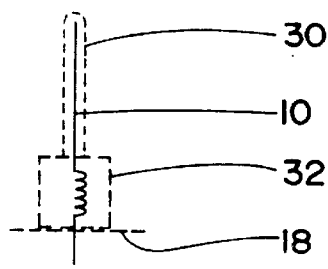
FIGS. 6(a)–6(e) and 6(i) schematically illustrate alternative embodiments of the improved antenna of the present invention for reducing antenna power.
Figure 6B:
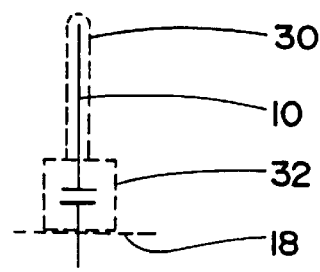
Figure 6C:
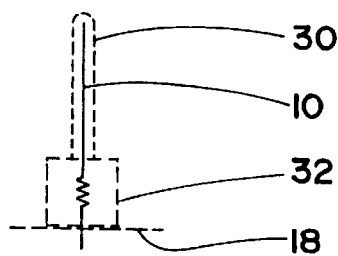
Figure 6D:
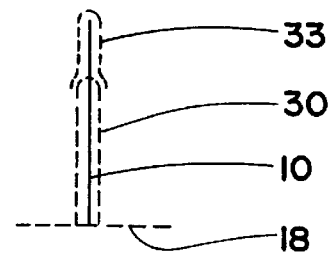
Figure 6E:
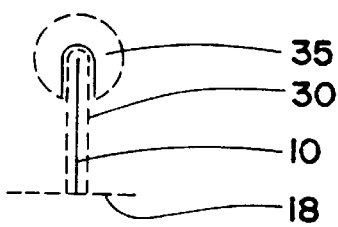
Figure 6F:
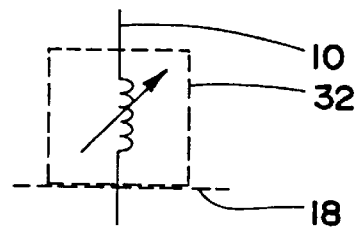
FIGS. 6(f)–6(h) schematically illustrate adjustable antenna power reduction means.
Figure 6G:
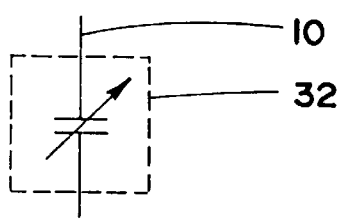
Figure 6H:
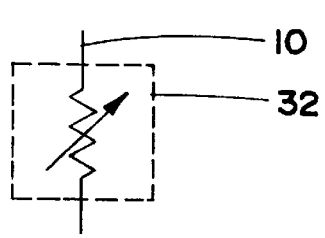
Figure 6I:
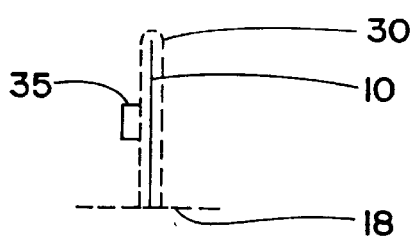

The use of a strip of dielectric material such as a lead powder impregnated vinyl mounted on antenna in opposed relation to user 14 is illustrated in FIGS. 2 and 3. It may be mounted along the length of antenna 10. It may also function as an SPE if the dielectric material is mounted only along a shortened length of antenna (as opposed to the entire length of antenna 10), towards the free end of antenna 10 as depicted in FIG. 5(d), as better described below.

Consider the case of the cellular phone and the antenna which make up a conductive path along which electrical currents flow back and forth. The current reaches a maximum in the middle and is small approaching either the top of the antenna or the bottom of the cell phone case or chassis.

Currents flowing back and forth create magnetic fields. So there is a magnetic field around the antenna which is stronger in the middle and weaker towards either end. This magnetic field in turn creates electric fields which travel out and themselves in turn create magnetic fields.

A simplistic but useful analogy is to think of the antenna and telephone case as a source of light. The closest thing would be a fluorescent tube, where light is emitted all along the length. To make an analogy clearer, imagine a fluorescent tube which is somewhat brighter in its middle and dimmer towards the ends.

The user of the cellular phone is, in effect, holding a fluorescent tube right next to his or her head. The heat from the fluorescent tube warms the head, and the strongest heating is at the point where the tube is closest to the head. In the same way, the strongest heat deposition in the brain from an actual cellular phone is at the surface of the brain which is closest to the antenna.

It is desirable to reduce this heating of the user's head. Other than the above described means for reducing the antenna power as the principle to obtain this objective, the present invention accomplishes this objective by placing an SPE near or at the tip of the antenna. Large currents flow back and forth in the SPE, as a result of excitation by the lower part of the antenna. Thus, the SPE is like a point source of radiation. It is as if a small but bright light bulb has been placed at the top end of the fluorescent tube. The mere fact this "light bulb" is somewhat farther from the user's head means that there is less heating of the user's head. In addition, since the addition of the SPE creates a mismatch in the antenna, the currents flowing in the main part of the antenna are reduced (except in the case where the antenna was originally not properly matched to the cellular phone circuitry and the SPE, when optimized according to the method of the present invention, actually results in a matching of the improved antenna with the cellular phone). In the analogy, the fluorescent bulb is made dimmer, but the dimming of the fluorescent bulb is compensated by the brightness from the light bulb end.

As illustrated in FIGS. 4 and 5, an SPE 24 is mounted on the end of antenna 10 within casing 26, Field 16 is consequently redistributed along antenna 10 away from user 14. The result is a reduction in the intensity of the radiation at hot spot 22 and a reduction in the overall amount of energy absorbed by user 14, in particular in the vicinity of hot spot 22. The reduction in the amount of energy absorbed by user 14 (or the amount of energy absorbed by any other dissipative medium in applications where the associated dissipative medium in close proximity to antenna 10 is other than user 14) increases the effective power of antenna 10 notwithstanding that the defacto power of antenna 10 may have been reduced by reason of the increased radiation resistance caused by the SPE.

The redistribution of field 16 towards the free end of antenna 10 also increases the effective exposure of antenna 10 resulting in improved reception by antenna 10.

Optimizing the improved antenna 10 incorporating SPE 24, in the case of the Motorola Micro T.A.C. 550 model, was accomplished by placing a near field radiation sensor in close proximity (approximating the position of hot spot 22 in FIG. 4a) to an operating Micro T.A.C. 550 model Motorola cellular phone having its retractable antenna extended. A far field sensor was placed several wavelengths away to read far field radiation. The end of the cellular phone antenna was clipped off to remove a small plastic knob conventionally formed on the free end of the antenna, the object of which, it is believed, is to prevent the antenna from being pushed irretrievably into the cellular phone casing. Removing the small plastic knob allowed an electrically conductive helical coil SPE to be slid over the free end of the antenna. The radiation from the antenna/SPE combination was optimized when the helical coil was slid approximately ¾ of its length onto the free end of the antenna. Very small movements (e.g. 2 mm) of the SPE along the antenna made substantial changes to the near and far field radiation. The position of the SPE on the antenna was optimized over the entire cellular phone bandwidth by minimizing the near field radiation (at hot spot 22 in FIG. 4a) while maximizing the far field radiation. It was possible to optimize the position of the SPE on the antenna so that, over the entire cellular phone bandwidth, near field radiation was reduced without significantly degrading the far field performance of the antenna.

It is understood that the SPE did not necessarily have to be a helical coil mounted over the antenna, for example as better set out below, it could have been any form of SPE in proximity to the end of the antenna, so long as selectively positioned relative to the antenna so as to be optimized.

By way of explanation, an SPE is some object which will have electrical currents flowing in it when placed in the vicinity of an operating antenna. An SPE is here defined as a parasitic element whose length is less than 75% of one-half of a wavelength and optimally approximately greater than or equal to 2 cm on a cellular phone, or like ratio depending on the radiation frequency, that is about ½0th of a wavelength. In practice, this length could be much smaller.

Figure 8:
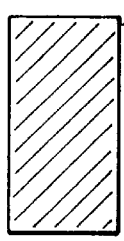
FIGS. 8(a)–8(i) illustrate alternative embodiments of short parasitic elements incorporated in the present invention.
Figure 8:
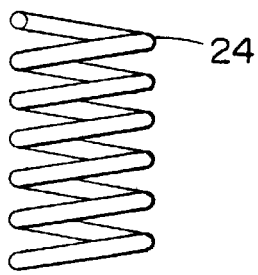
Figure 8:
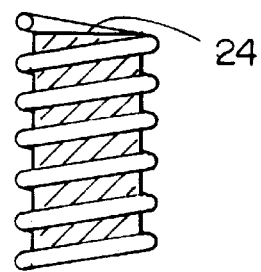
Figure 8:
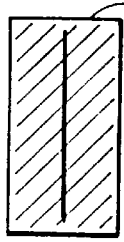
Figure 8:
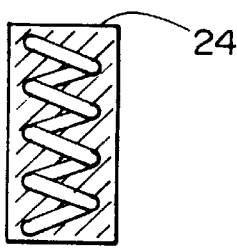
Figure 8:
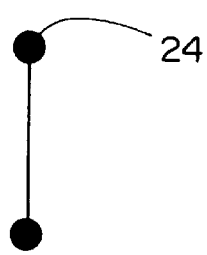
Figure 8:
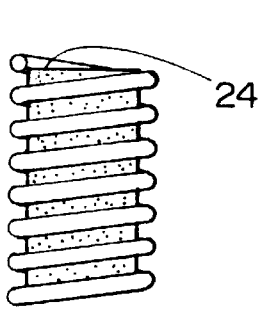
Figure 8:
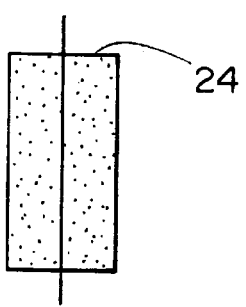
Figure 8:
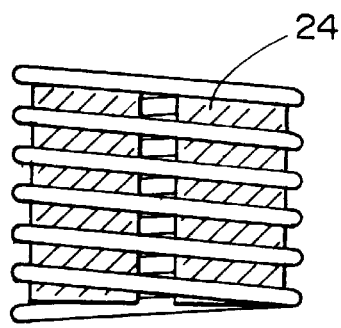

In FIG. 8, the following SPEs are illustrated by way of example:

(a) dielectric rod;
(b) wire coil;
(c) wire coil around a dielectric rod;
(d) straight wire inside dielectric rod;
(e) wire coil inside a dielectric rod;
(f) straight wire with conductive spheres at both ends;
(g) wire coil around magnetically permeable material; and
(h) permeable material around straight wire.

FIG. 8 (g) may also be taken to represent a wire coil around or embedded in a cylinder or shell consisting of a mixture of a heavy metal or heavy metal powder and in an inert matrix, such as lead-vinyl. It is understood that the dielectric rod or permeable material of FIGS. 8(a)–8(h) may have bores, cavities, grooves or channels for receiving the free end of the antenna, or, for example, in FIG. 8(i), the dielectric rod or permeable material may be split so as to pass the free end of the antenna between the split portions.

The concept of an SPE is not limited to the above list. What is not well known is to place an SPE in proximity to an antenna toward the end of the antenna so as to redistribute the near field radiation field towards the SPE and away from a dissipative medium adjacent the base of the antenna.

Figure 9:
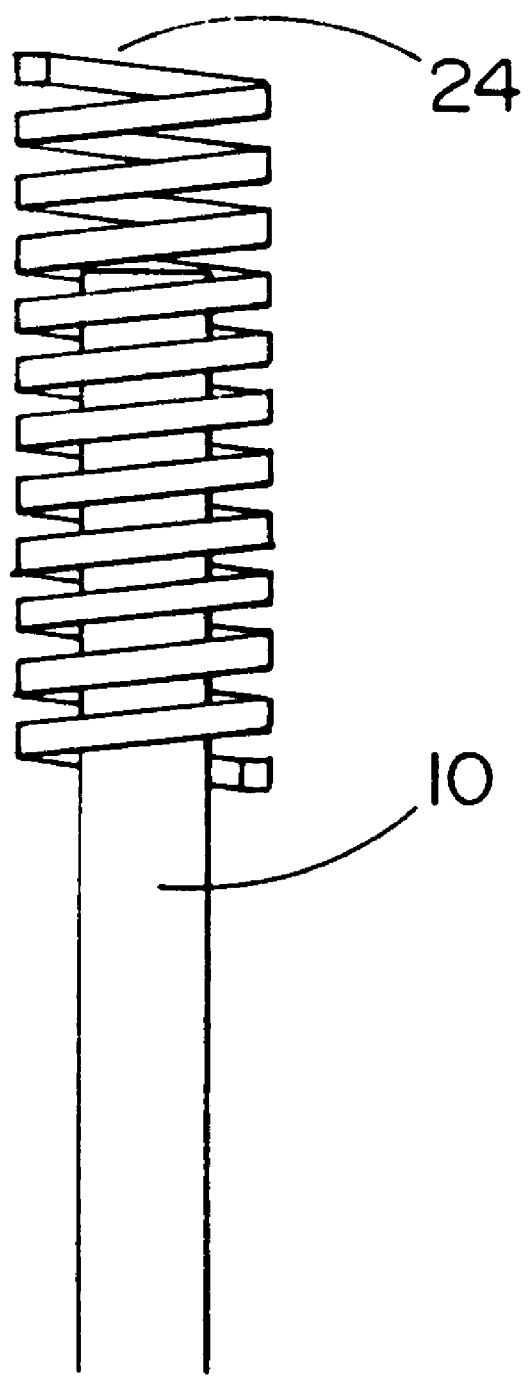
FIG. 9 is a front elevation view of a conventional antenna having a helical wire coil SPE mounted thereon.

Successful testing was conducted on the improved antenna, illustrated in FIG. 9, for a cellular phone operating in the vicinity of 800 MHZ. In particular, the antenna 10 consisted of a straight wire and plastic composite rod which, it is believed, is the standard antenna currently marketed by Motorola on its Micro T.A.C. 550 model personal digital communicator cellular phone near the end of which was mounted an SPE 24. The SPE 24 was an electrically conductive helical wire coil having a straightened length of 18 cm (one-half a wavelength). The length of the coil was 24.5 mm. The inside diameter of the coil was 4.0 mm and the outside diameter was 5.5 mm. The coil consisted of 11 turns of 20 gauge wire. The free end of antenna 10 was inserted into the helical coil a distance of 17 mm.

The SPE cannot be too short if it is to radiate effectively. However, even a short SPE may still work well merely by adding some capacitance. If the coil is wrapped around a dielectric or embedded in a dielectric, the length of wire needed will be less than a half wavelength, as would be apparent to one skilled in the art. If the coil is wrapped around a magnetically permeable material (for example ferrite), the length of wire needed will be less than a half wavelength, as would be apparent to one skilled in the art. If the coil is too short, the antenna will not work well. One skilled in the art would recognize that radiation resistance of the SPE would be too small in this case for effective operation. Thus, it would be known that prior art metal tipped antennas having metal tips or spheres at their free ends would not work to improve antenna performance because they are too short for effective top loading of the antenna. If the coil diameter is too small the antenna will not work well. One skilled in the art would recognize that the bandwidth would be small, or that excessively thin wire would be required. If the coil diameter is too great, the antenna will not work well. One skilled in the art would recognize that insufficient coupling to the main antenna wire would occur. If the wire used to wind the coil is too thin, the antenna will not work well. If the wire used is so thick that the distance between turns is small compared to the diameter of the wire, the antenna may not work well. As in the standard art of electrical coil design, one skilled in the art would select a thickness of wire to obtain optimum results. Tilting the SPE as shown in FIG. 9(c) may have a beneficial effect in reducing the energy absorbed in the user's body. One skilled in the art would adjust this tilt until optimum results were achieved.

The same arrangement would apply to a cellular phone operating at a different frequency, such as 450 MHz. 900 MHz or 1.8 GHz, may be used by resealing the coil according to the new wavelength. In the case of dipole antennas an SPE 24 at one or both ends of the free end of the dipole antenna.

Figure 10:
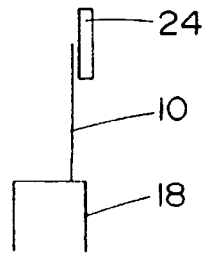
FIGS. 10(a)–10(g) illustrate alternative embodiments of parasitically top-loaded antennas.
Figure 10:
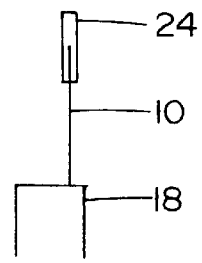
Figure 10:
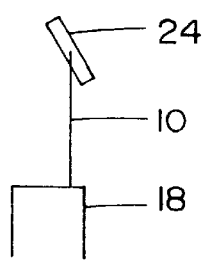
Figure 10:
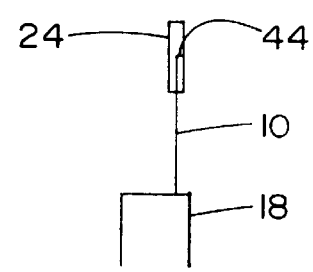
Figure 10:
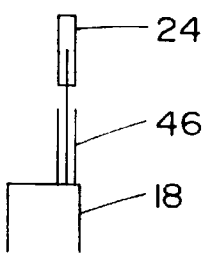
Figure 10:
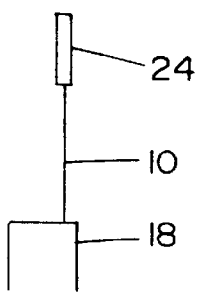
Figure 10:
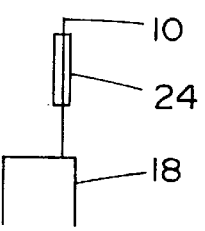

In FIG. 10, several designs for parasitically top-loaded antennas are shown:

(a) in FIG. 10(a) the SPE 24 is driven from its side, in any position parallel to antenna 10 relative to telephone 18;

(b) in FIG. 10(b) the SPE 24 is driven from its middle and antenna 10 extends into the body of the SPE;

(c) in FIG. 10(c) the SPE 24 is tilted at an angle relative to antenna 10;

(d) in FIG. 10(d) there is an electrical connection 44 between antenna 10 and SPE 24;

(e) in FIG. 10(e) the SPE 24 is at or near the end of a coaxial cable 46;

(f) in FIG. 10(f) the SPE 24 is mounted atop antenna 10 with its longitudinal axis coaxial with the longitudinal axis of antenna 10, and antenna 10 does not extend into the body of the SPE;

(g) in FIG. 10(g) the SPE 24 is again mounted coaxial with antenna 10, but antenna 10 extends through, and protrudes from the top of, SPE 24.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A radiation reduction apparatus for a portable communication device comprises antenna near field radiation pattern redistribution means for redistributing near field radiation away from a user of said radio communication device, said antenna near field radiation pattern redistribution means mountable in proximity to a radio communication device antenna on a side of said antenna opposed to said user, wherein said antenna near field radiation pattern redistribution means comprises a block of dielectric material, said block mountable to said antenna along a portion of said antenna.

2. The device of claim 1 wherein said block of dielectric material has a dielectric constant of at least 3.

3. The device of claim 1 wherein said block of dielectric material has a dielectric constant of at least 6.

4. The device of claim 1 wherein said block of dielectric material has a dielectric constant of at least 9.

5. The device of claim 1 wherein said block of dielectric material has a dielectric constant of at least 12.

6. The device of claim 1 wherein said block of dielectric material has a dielectric constant of at least 15.

7. An improved antenna for a portable radio communication device comprising:

a first elongate electrically conductive member having opposed first and second ends, said first end adapted to be mounted in electrical communication to a radio communication device, whereby when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance comprises means for decreasing current in said first elongate electrically conductive member, wherein said means for decreasing current is an inductor.

8. An improved antenna for a portable radio communication device comprising:

a first elongate electrically conductive member having opposed first and second ends, said first end adapted to be mounted in electrical communication to a radio communication device, whereby when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance comprises means for decreasing current in said first elongate electrically conductive member, wherein said means for decreasing current is a resistor.

9. An improved antenna for a portable radio communication device comprising:

a first elongate electrically conductive member having opposed first and second ends, said first end adapted to be mounted in electrical communication to a radio communication device, whereby when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance comprises means for decreasing current in said first elongate electrically conductive member, wherein said means for decreasing current is a capacitor.

10. An antenna improvement device for a portable radio communication device antenna, wherein said antenna is a first elongate electrically conductive member having opposed first and second ends and said first end is adapted to be mounted in electrical communication to a radio communication device, and wherein when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, said antenna improvement device comprising:

means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance comprises means for decreasing current in said first elongate electrically conductive member, wherein said means for decreasing current is a resistor.

11. An antenna improvement device for a portable radio communication device antenna, wherein said antenna is a first elongate electrically conductive member having opposed first and second ends and said first end is adapted to be mounted in electrical communication to a radio communication device, and wherein when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, said antenna improvement device comprising:

means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance comprises means for decreasing current in said first elongate electrically conductive member, wherein said means for decreasing current is an inductor.

12. An antenna improvement device for a portable radio communication device antenna, wherein said antenna is a first elongate electrically conductive member having opposed first and second ends and said first end is adapted to be mounted in electrical communication to a radio communication device, and wherein when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, said antenna improvement device comprising:

means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance comprises means for decreasing current in said first elongate electrically conductive member, wherein said means for decreasing current is a capacitor.

13. An improved antenna for a portable radio communication device comprising:

a first elongate electrically conductive member having opposed first and second ends, said first end adapted to be mounted in electrical communication to a radio communication device, whereby when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance of said first elongate electrically conductive member is a short parasitic element, wherein said short parasitic element is a helical electrically conductive coil.

14. The device of claim 13 wherein said helical electrically conductive coil is mountable over said second end to thereby journal said second end within a cavity within said helical electrically conductive coil at least partially along said cavity.

15. An antenna improvement device for a portable radio communication device antenna, wherein said antenna is a first elongate electrically conductive member having opposed first and second ends and said first end is adapted to be mounted in electrical communication to a radio communication device, and wherein when said first elongate electrically conductive member is mounted in electrical communication to a radio communication device, a radiation field pattern is generated by radiation emitted by said first elongate electrically conductive member and said radio communication device during radio transmission, said radiation field pattern having maximum intensity at a first location, said antenna improvement device comprising:

means for increasing radiation resistance of said first elongate electrically conductive member mountable at an optimized position at generally said second end, whereby, when said means for increasing radiation resistance is mounted to said first elongate electrically conductive member at said optimized position at generally said second end and said first elongate electrically conductive member is mounted in electrical communication to a radio communication device, during radio transmission said radiation field pattern maximum intensity is shifted from said first location to a second location closer to said second end, and near field intensity of said radiation field pattern at said first location is reduced over an operational bandwidth of said radio communication device, wherein said means for increasing radiation resistance of said first elongate electrically conductive member is a short parasitic element, wherein said short parasitic element is a helical electrically conductive coil.

16. The device of claim 15 wherein said helical electrically conductive coil is mountable over said second end to thereby journal said second end within a cavity within said helical electrically conductive coil at least partially along said cavity.

\* \* \* \* \*